(12) United States Patent
Hipwell, Jr. et al.

(10) Patent No.: US 8,192,087 B2
(45) Date of Patent: Jun. 5, 2012

(54) MICROFABRICATED FLUID DYNAMIC BEARING

(75) Inventors: Roger L. Hipwell, Jr., Eden Prairie, MN (US); Alan L. Grantz, Aptos, CA (US); Dadi Setiadi, Edina, MN (US); Yang Li, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 450 days.

(21) Appl. No.: 12/473,243

(22) Filed: May 27, 2009

(65) Prior Publication Data

US 2010/0303393 A1 Dec. 2, 2010

(51) Int. Cl.
*F16C 32/06* (2006.01)
(52) U.S. Cl. .................. 384/107; 384/112; 384/110
(58) Field of Classification Search .............. 384/100, 384/107, 108, 110, 111, 112
See application file for complete search history.

(56) References Cited

U.S. PATENT DOCUMENTS

| | | | | |
|---|---|---|---|---|
| 5,692,840 A * | 12/1997 | Rhoton et al. | ................ | 384/110 |
| 5,709,480 A * | 1/1998 | Hong | ............................. | 384/100 |
| 5,934,810 A * | 8/1999 | Choi et al. | .................... | 384/108 |
| 5,957,588 A * | 9/1999 | Wahl | ............................. | 384/108 |
| 6,439,774 B1 * | 8/2002 | Knepper et al. | .............. | 384/110 |

* cited by examiner

*Primary Examiner* — Patrick MacKey

(57) ABSTRACT

A fluid dynamic bearing formed by a microelectromechanical systems (MEMS) wafer-level batch-fabrication process is provided. The process results in a high performance and high reliability fluid dynamic bearing having features including higher bearing lifetime at high RPM, improved bearing stiffness, durability and thrust/restoring forces capabilities. The present invention is especially useful with small form factor disc drive memory devices having constraints in motor height, such as a 2.5 inch disc drive, requiring high performance including high rotational speed and large areal density. A sacrificial layer is utilized in the process to simultaneously form symmetrical facing surfaces of relatively rotatable components. The facing surfaces define, therebetween, a desired feature, such as a journal bearing, a thrust bearing, a fluid channel, a fluid reservoir, a capillary seal, pressure generating grooves, and other profile geometries. Such geometry control allows for design freedom in obtaining a desired bearing performance and stiffness.

20 Claims, 8 Drawing Sheets

MICROFABRICATED FLUID DYNAMIC BEARING

FIELD

The invention relates generally to fluid dynamic bearings, and more particularly to a microfabricated fluid dynamic bearing for use with disc drive data storage systems.

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disc to ensure the proper reading and writing of information. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs. Because rotational accuracy is critical, many disc drives presently utilize a spindle motor having a fluid dynamic bearing (FDB) situated between a shaft and sleeve to support a hub and the disc for rotation. The stiffness of the fluid dynamic bearing is critical so that the rotating load is accurately and stably supported on the spindle without wobble or tilt. In a hydrodynamic bearing, a lubricating fluid is provided between a fixed member bearing surface and a rotating member bearing surface of the disc drive. Hydrodynamic bearings, however, suffer from sensitivity to external loads or mechanical shock.

In an effort for reduced sized motors, microfabrication is sometimes employed, microfabrication being a process of fabrication of miniature structures. Most conventional microfabricated microelectromechanical (MEMS) rotary bearings rely on an air bearing, an externally supplied gas or pressurization, or a contact journal bearing. Air bearings, however, have practical limitations relating to startup, thrust force, and lifetime. Further, inherent mechanical wear on the facing surfaces of both bearing types creates a significant failure mechanism for FDB motors.

SUMMARY

A method of microfabricating a fluid dynamic bearing, and a microfabricated fluid dynamic bearing for use with a disc drive data storage system are provided. In an embodiment, the present invention utilizes microelectromechanical systems (MEMS) wafer-level batch-fabrication processes. A sacrificial layer is utilized in a batch-fabrication process to simultaneously form symmetrical facing surfaces of a stationary component and a rotatable component that are positioned for relative rotation. The facing surfaces define, therebetween, a desired FDB feature, such as a journal bearing, a thrust bearing, a fluid channel, a fluid reservoir, a capillary seal, a grooved pumping seal, pressure generating grooves, or arbitrary profile geometries. Such geometry control allows for design freedom in obtaining a desired bearing performance and stiffness. The present invention is especially useful with small form factor disc drives having constraints in motor height, such as a 2.5 inch disc drive, requiring high performance including high rotational speed and large areal density. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
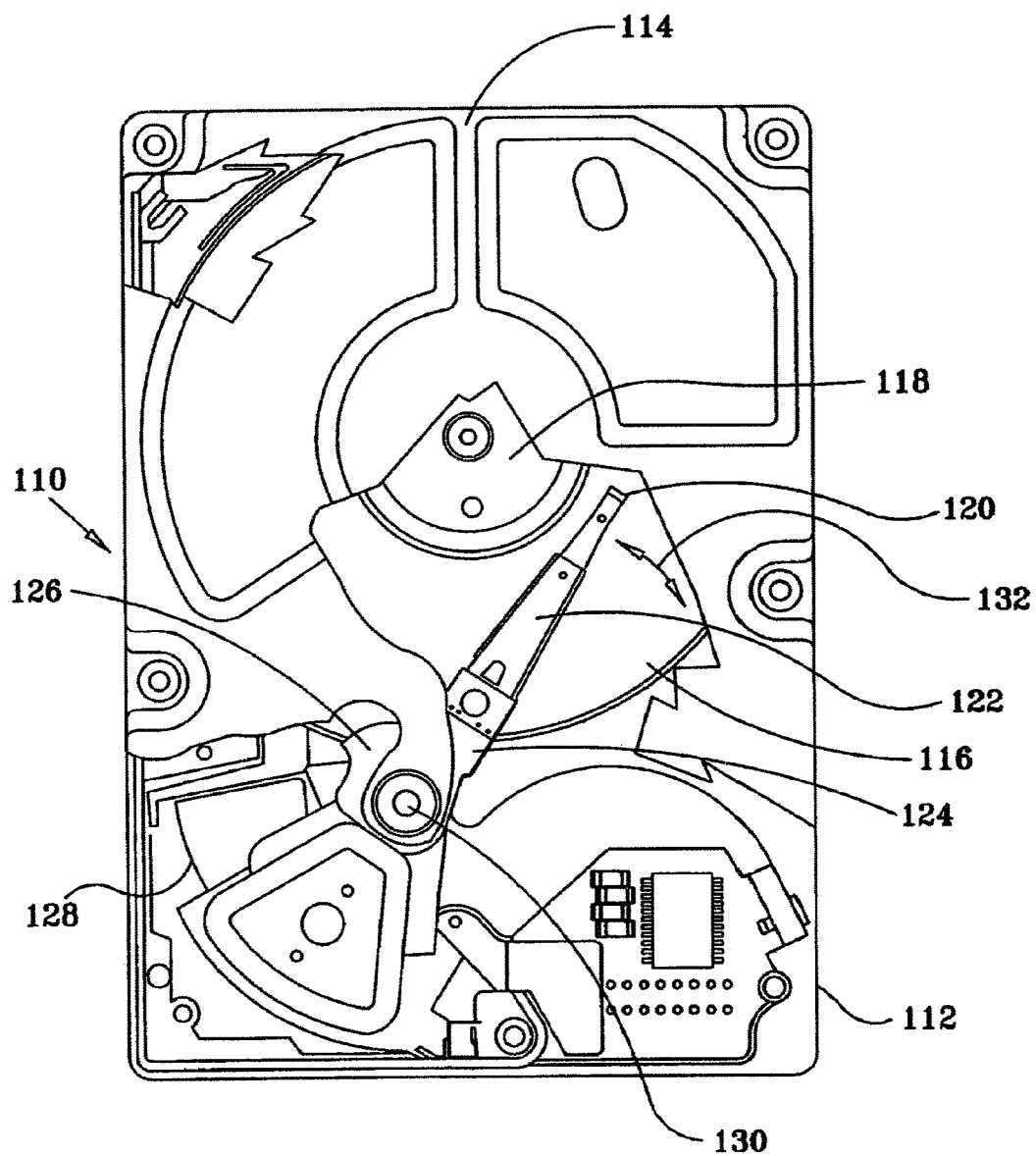
FIG. 1 is a top plan view of a disc drive data storage system in which the present invention is useful, in accordance with an embodiment of the present invention.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

Efforts are underway to reduce the size of the smallest conventional fluid dynamic bearing (FDB) motors to meet many small FDB applications, such as disc drives or small rotary motors. However, a number of critical technical design obstacles exist in reduced size motors. In order to utilize existing technology for many FDB applications, part dimensions must be reduced by about two-thirds from the present state of the art. Thus, motor shaft diameters would be reduced to about 0.6 mm, and shaft lengths would be reduced to about 0.8 mm. Current conventional machining technology is not fully capable in this size regime. As motors become shorter, the spacing between the journal bearings decreases. A consequence of decreased journal bearing spacing is the minimization of angular or rocking stiffness of the bearings. With a reduction in size of about two-thirds of conventional parts, the closeness of the journal bearings can result in inadequate angular stiffness of a conventional shaft/thrustplate configuration.

Further, conventional manufacturing of FDB motors requires separate fabrication and subsequent matching of the rotor and stator geometries to minimize gap variations that lead to mismatches, additional metrology requirements, and fewer integration options. Also, grooving in bearing journals and thrust plate region is not feasible with existing conventional machining technology. Therefore, although small scale bearings, of less than about 5 mm in diameter, can be manufactured by conventional fabrication methods, they are limited by size as compared to a batch fabrication, semiconductor/MEMS based process. It is therefore desirable to design reduced-size motors that are compatible with MEMs fabrication technology to allow for maximum integration capabilities and batch fabrication cost advantages. Conventional (larger scale) FDBs offer a high-performance rotary support and dynamic performance, but have not been implemented in MEMS and small scale applications.

A microfabrication method and apparatus are described herein for providing a microfabricated fluid dynamic bearing. In an embodiment, the present invention utilizes microelectromechanical systems (MEMS) wafer-level batch-fabrication processes to establish a defined rotor/stator gap, a capillary seal, a central capillary fluid channel, and fluid dynamic grooving features. A sacrificial layer is utilized in a batch-fabricated silicon bearing mold to simultaneously form symmetrical facing surfaces of a stationary component and a rotatable component that are positioned for relative rotation. The facing surfaces define, therebetween, a desired FDB feature, such as a journal bearing, a thrust bearing, a fluid channel, a fluid reservoir, a capillary seal, a grooved pumping seal, or pressure generating grooves, or arbitrary profile geometries. Such geometry control allows for design freedom in obtaining a desired bearing performance and stiffness.

In an embodiment, the present invention fluid dynamic bearing provides a high-performance, high reliability MEMS-fabricated bearing having features including higher bearing lifetime at high RPM (i.e., 10,000 RPM and higher), improved bearing stiffness, durability and thrust/restoring forces capabilities. The present invention is especially useful with small form factor disc drives having constraints in motor height, such as a 2.5 inch disc drive, requiring high performance including high rotational speed and large areal density. The present invention provides improved integration of electrical/mechanical/magnetic elements, better manufacturing cost scaling, and minimized rotor/stator inspection/metrology requirements.

It will be apparent that features of the discussion and claims may be utilized with a variety of fluid dynamic bearing designs, disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical or spherical bearings. Further, embodiments of the present invention may be employed with a fixed shaft or a rotating shaft. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures as described in this Description and should not be construed as limiting.

Referring to the drawings wherein identical reference numerals denote the same elements throughout the various views, FIG. 1 illustrates a top plan view of a contemporary disc drive data storage system 110 in which the present invention is useful. Features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
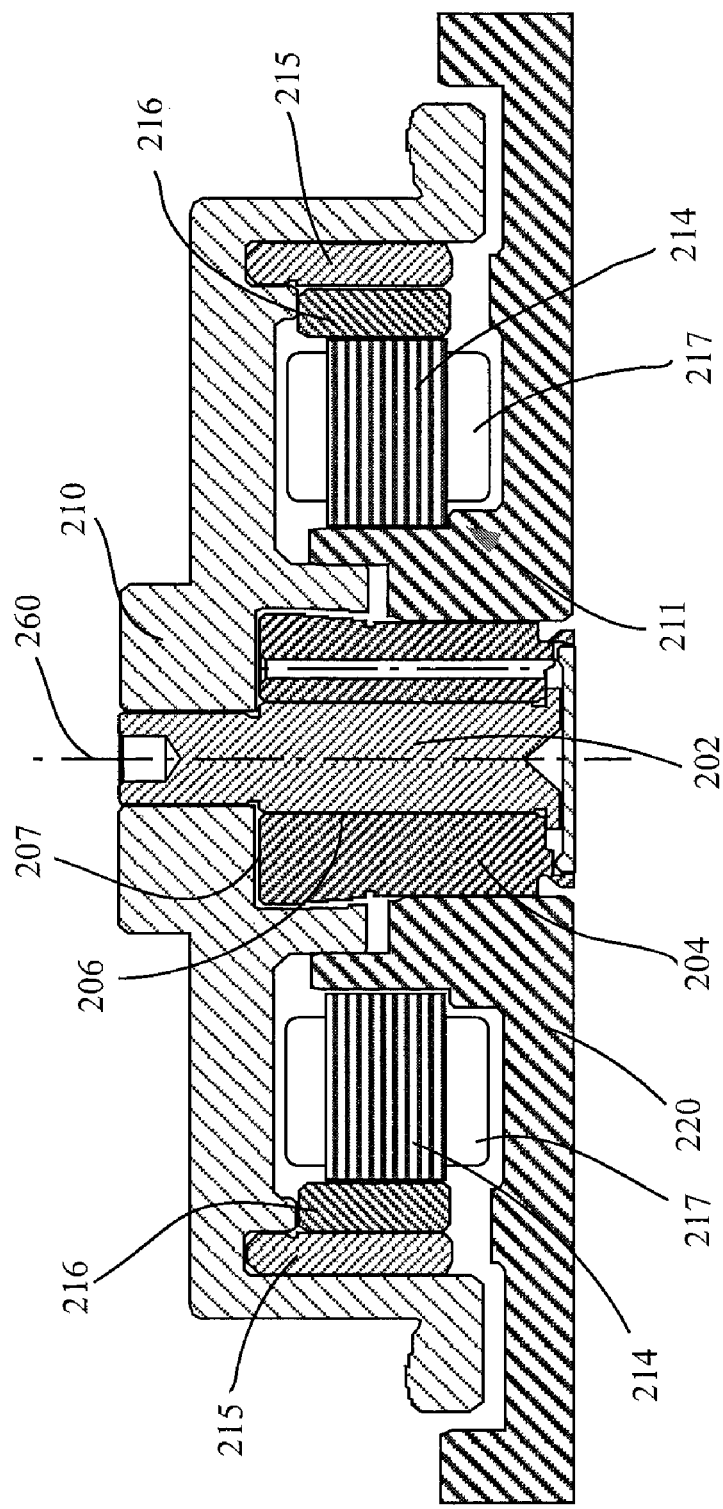
FIG. 2 is a sectional side view of a contemporary fluid dynamic bearing motor as used in a disc drive data storage system.

Referring to FIG. 2, a sectional side view is illustrated of a contemporary fluid dynamic bearing motor as used in a disc drive data storage system 110. This fluid dynamic bearing motor includes a rotatable component that is relatively rotatable about a stationary component, defining a journal bearing 206 therebetween. In this example, the rotatable components include shaft 202 and hub 210. In an alternative design, the shaft 202 is a stationary component, and the sleeve 204 is a rotatable component. Hub 210 includes a disc flange, which supports disc pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form two or more magnetic poles. The stationary components include sleeve 204 and stator 211, which are affixed to base plate 220. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that usable fluids include a liquid, a gas, or a combination of a liquid and gas.

Figure 3:
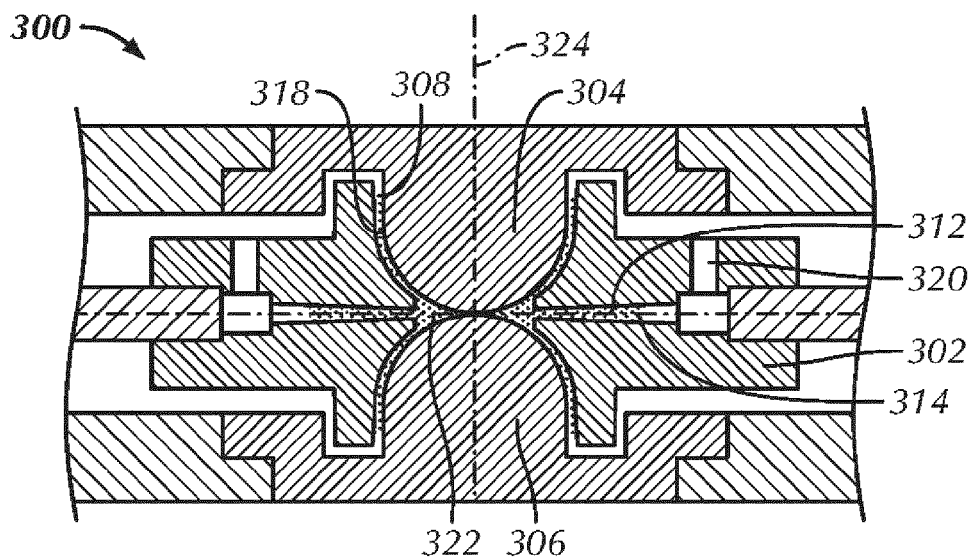
FIG. 3 is a sectional side view of a portion of a fluid dynamic bearing, which can be utilized in the motor as in FIG. 2, illustrating two facing bi-spherical bearing surfaces and a capillary sealing system formed by microfabrication, in accordance with an embodiment of the present invention.

FIG. 3 is a sectional side view of a portion of a fluid dynamic bearing 300, which can be utilized in the motor as in FIG. 2, illustrating two facing bi-spherical bearing surfaces and a capillary sealing system formed by microfabrication, in accordance with an embodiment of the present invention.

In an example, spherical bearing components 304 and 306 are stationary components. Rotatable component 302 is situated to rotate relative to components 304 and 306. The stationary bearing components 304 and 306 are connected with a stator, and the rotatable component 302 is connected to a magnet for rotation (not shown). The top and bottom bi-spherical bearing components 304 and 306 are identical, except for grooving patterns (shown in FIG. 5A), which are mirror images of each other. A hemispherical (or quasi-hemispherical) shape is chosen for the bearing components 304 and 306 since it is relatively insensitive to misalignment between the top and bottom bearing components. In other words, a slight misalignment in the x-y plane between the bearing components will result in a tilting of the spin axis, but the bearing gap geometry will be relatively unaffected.

A fluid dynamic bearing 318 is defined between the facing surfaces of the stationary spherical components 304, 306 and the rotatable component 302. A capillary seal 308 is situated at an end of the fluid dynamic bearing 318 to seal the fluid within i.e., a motor, and a high fluid volume diverging capillary seal 314 is situated within the fluid channel 312 within rotatable component 302.

At least a portion of the facing surfaces of spherical components 304, 306 and rotatable component 302 are symmetrical and are formed by a microfabrication process. The microfabrication process described herein provides surfaces that are symmetrical in all directions, including axially and radially. The stationary and rotating components are fabricated together along with the bearing gap, so that the relationship of the components is established. The shape of the rotating component is determined by the shape of the stationary component. The process employs a sacrificial layer (described in more detail in FIGS. 8A and 8B) to simultaneously form the symmetrical facing surfaces of at least a portion of a stationary component and a rotatable component that are positioned for relative rotation. The facing surfaces (i.e., surface of spherical component 304 and rotatable component 302) define, therebetween, at least one of a gap, a journal bearing, a thrust bearing, a fluid channel, a fluid reservoir, a capillary seal, a grooved pumping seal, pressure generating grooves, or arbitrary profile geometries.

The present invention provides a method for maintaining the bearing gap 318 between the rotating and stationary members. When the bearing 318 is operating at the design speed, it produces both radial and axial forces. In conventional FDB designs, the bearing gap (which has typical tolerance requirements of 1 micron) is critical to providing the desired performance. In the present invention design, the bearing gap 318 is fabricated as part of an etching process (described in FIGS. 8A and 8B), and is maintained by preloading the upper and lower stationary hemispheres together through deflection of the top and bottom drive outer walls. The preloading force has to be sufficient to prevent the halves from separating during shock.

By forming the facing surfaces with an axial or a radial asymmetry tolerance of less than 1 micron, it is to be appreciated that the methods described herein can be utilized with fluid dynamic bearings with a small form factor motor for a disc drive data storage device, as with for example a disc drive bearing having a diameter of less than 5 millimeters, a shaft with a diameter of less than 0.6 mm and a length less than 0.8 mm. Further, the microfabricated fluid dynamic bearing can be integrated with additional electrical, mechanical, or magnetic layers. While a spherical shape is demonstrated, conical designs (partial or complete) may also be employed with the methods described herein.

Figure 4:
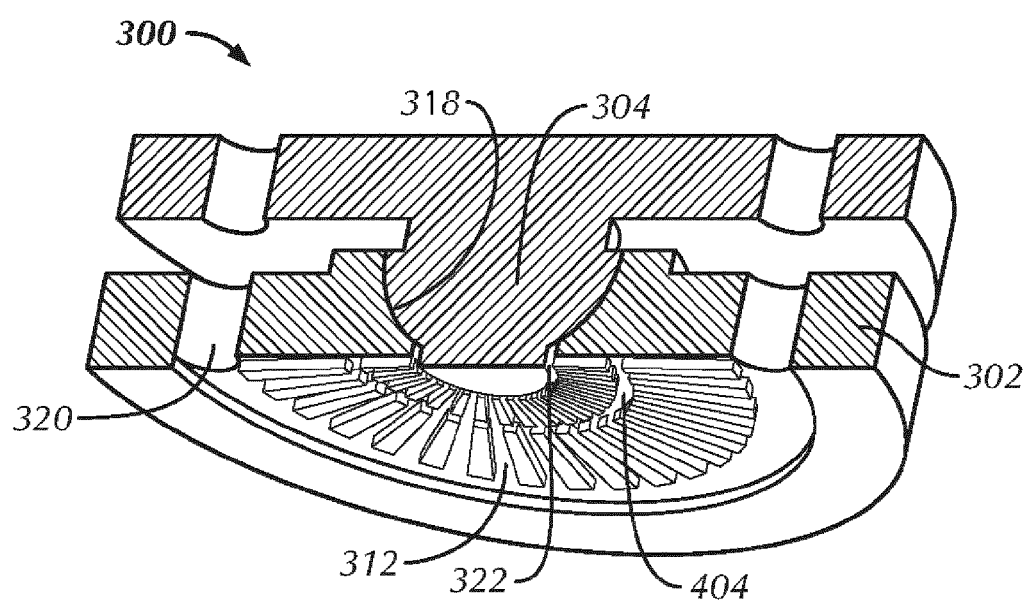
FIG. 4 is a perspective view of a cross section of a portion of the fluid dynamic bearing as in FIG. 3, also illustrating two facing bi-spherical bearing surfaces and a capillary sealing system formed by microfabrication, in accordance with an embodiment of the present invention.

Referring to FIG. 4, a perspective view is illustrated of a portion of the fluid dynamic bearing 300 as in FIG. 3, further illustrating the diverging capillary sealing system formed by microfabrication. The microfabricated fluid channel system utilizes capillary forces for distribution and control of the bearing fluid. The system is compatible with batch fabrication methods for both forming and systematically filling with bearing fluid.

FDB 300 is designed with opposing capillary seals, which are intentionally imbalanced in an asymmetrical sealing system. The diverging capillary seal 314 is fluidly connected to and opposes capillary seal 308, the capillary seal 308 having a smaller diameter than the diverging capillary seal 314, and the fluid dynamic bearing 318 being fluidly connected with fluid channel 312 by way of fluid plenum 322.

The capillary seal 308 is situated within a relatively small gap 318 and a small fluid volume, and is intended to be much stiffer (resistant to leakage) than the diverging capillary seal 314, which is situated within a relatively large gap 312 and has a larger volume. The capillary seals 308 and 314 operate by employing a diverging geometry, wherein the divergence pulls fluid in the direction of decreasing gap. The fluid dynamic bearing 318 is consistently filled with oil, since capillary seal 308 is stronger than the diverging capillary seal 314, and since the fluid channel 312 area serves as a fluid reservoir and replenishes oil in the fluid dynamic bearing 318 when it is reduced due to evaporation, shock or thermal expansion.

Fluid channel 312 is shown with 2 separated segments, separated by an optional balancing channel 404 provided to help distribute the oil equally into the diverging capillary seal 314. Capillary attraction draws oil into the fluid dynamic bearing area 318.

Filling of the fluid dynamic bearing 318 is accomplished by injecting a volume of oil into one of the fill/vent holes 320. Fluid fill hole 320 is situated to connect with the fluid channel 312 at a radially outboard position. Capillary attraction draws oil into the capillary seal area.

Figure 5A:
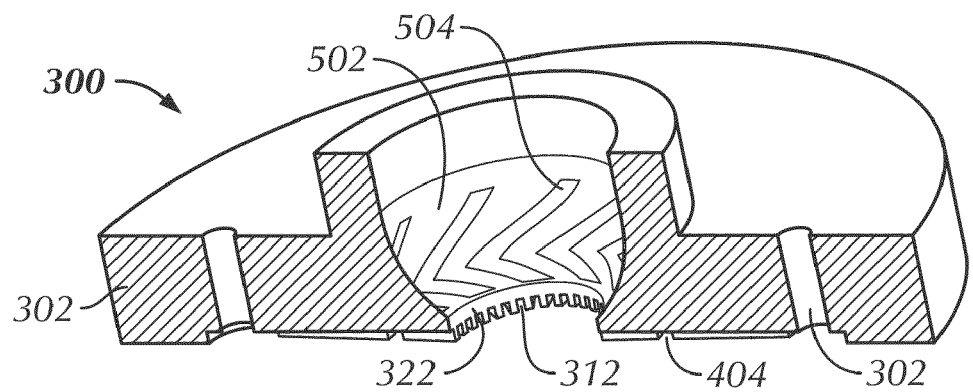
FIG. 5A is a perspective view of a cross section of a portion of the fluid dynamic bearing as in FIG. 3, illustrating a spherical bearing surface with herringbone grooves and capillary seal grooves formed by microfabrication, in accordance with an embodiment of the present invention.

Turning now to FIG. 5A, a perspective view is shown of a cross section of a portion of the rotatable component 302 of the fluid dynamic bearing 300, as in FIG. 3. The surface 502 of the rotatable component that faces a surface of the stationary spherical component 304 or 306 is illustrated. The fluid plenum area 322 is also shown that fluidly connects the fluid dynamic bearing with the fluid channel 312 within the rotatable component 302. A fluid dynamic bearing is defined between the two facing surfaces, and herringbone grooves 504 are established on at least one of the facing surfaces by the microfabrication process defined herein. The microfabrication process provides a well defined and symmetrical gap between the stationary and rotatable components for the fluid dynamic bearing. The angular stiffness of the bearing assembly is enhanced by the relatively wide separation of the hemispherical elements. The separation distance between the contact points along the spheres results in a relatively large restoring moment. The stationary and rotating components are fabricated together along with the fluid dynamic bearing gap, so that the relationship of the parts is fixed and symmetrical. The shape of the rotating part is determined by the shape of the fixed part.

Figure 5B:
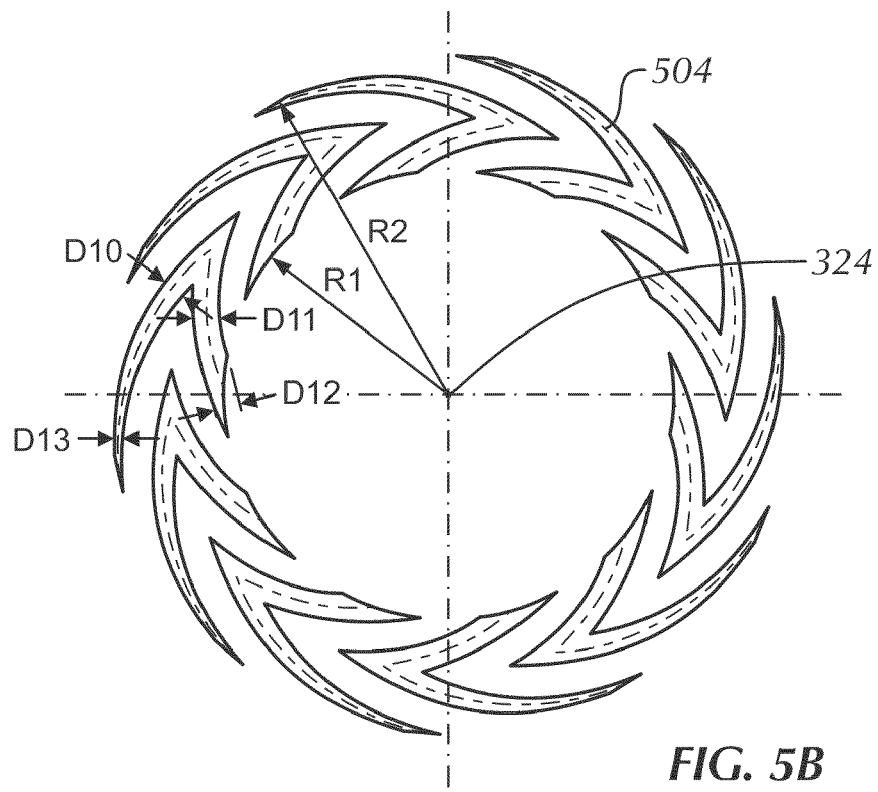
FIG. 5B is a view of microfabricated herringbone grooves utilized with the fluid dynamic bearing of FIG. 5A, in accordance with an embodiment of the present invention.

FIG. 5B illustrates details of the microfabricated herringbone grooves utilized with the fluid dynamic bearing 300 of FIG. 5A. The fluid bearing grooves 504 are patterned on the stationary component and/or the rotatable component surfaces. These grooves are etched or formed directly into the spherical/conical bearing surfaces and the thrust plate to provide proper fluid dynamic bearing performance. Precise groove dimensions can be accomplished by the microfabrication process described herein. In an example embodiment having a flat radially extending thrust surface, the critical dimensions (from the center axis 324 of the fluid dynamic bearing) include the radius R1 to the inside diameter and the radius R2 to the outside diameter of the groove. Other critical dimensions that are accomplished by the microfabrication process described herein include diameters D10, D11, D12 and D13 defining diameters, shapes and groove orientations.

The bearing stiffness is a result of the grooving pattern. A herringbone pattern is employed with the illustrated design. Pressure is built up toward the apex of the grooves. In the case of a fluid dynamic bearing, the upper and lower grooves of each herringbone are chosen to balance each other, and produce no net longitudinal flow. While the grooves are shaped as herringbone, other shapes may be utilized with alternative bearing designs including sinusoidal, spiral and chevron.

Figure 6A:
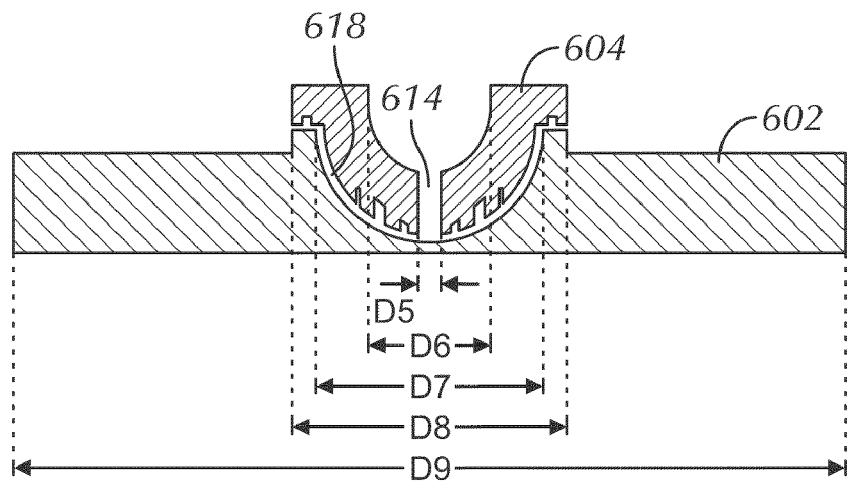
FIG. 6A is a sectional side view of a portion of an alternative fluid dynamic bearing design, illustrating a spherical bearing with a fluid fill hole and grooves formed by microfabrication, in accordance with an embodiment of the present invention.

FIG. 6A is a sectional side view of a portion of an alternative fluid dynamic bearing, illustrating a spherical bearing with a fluid fill hole and grooves formed by microfabrication. The spherical bearing stationary component 604 faces a surface of the rotatable component 602 with the fluid dynamic bearing 618 defined therebetween. In the embodiment shown, a fluid fill hole 614 is formed through the spherical component 604 for filling oil into the fluid dynamic bearing 618, and to serve as a fluid reservoir. As described in more detail in FIG. 8B, the fluid fill hole 614 is formed during the microfabrication by ion milling a portion of the stationary component.

Figure 8A:
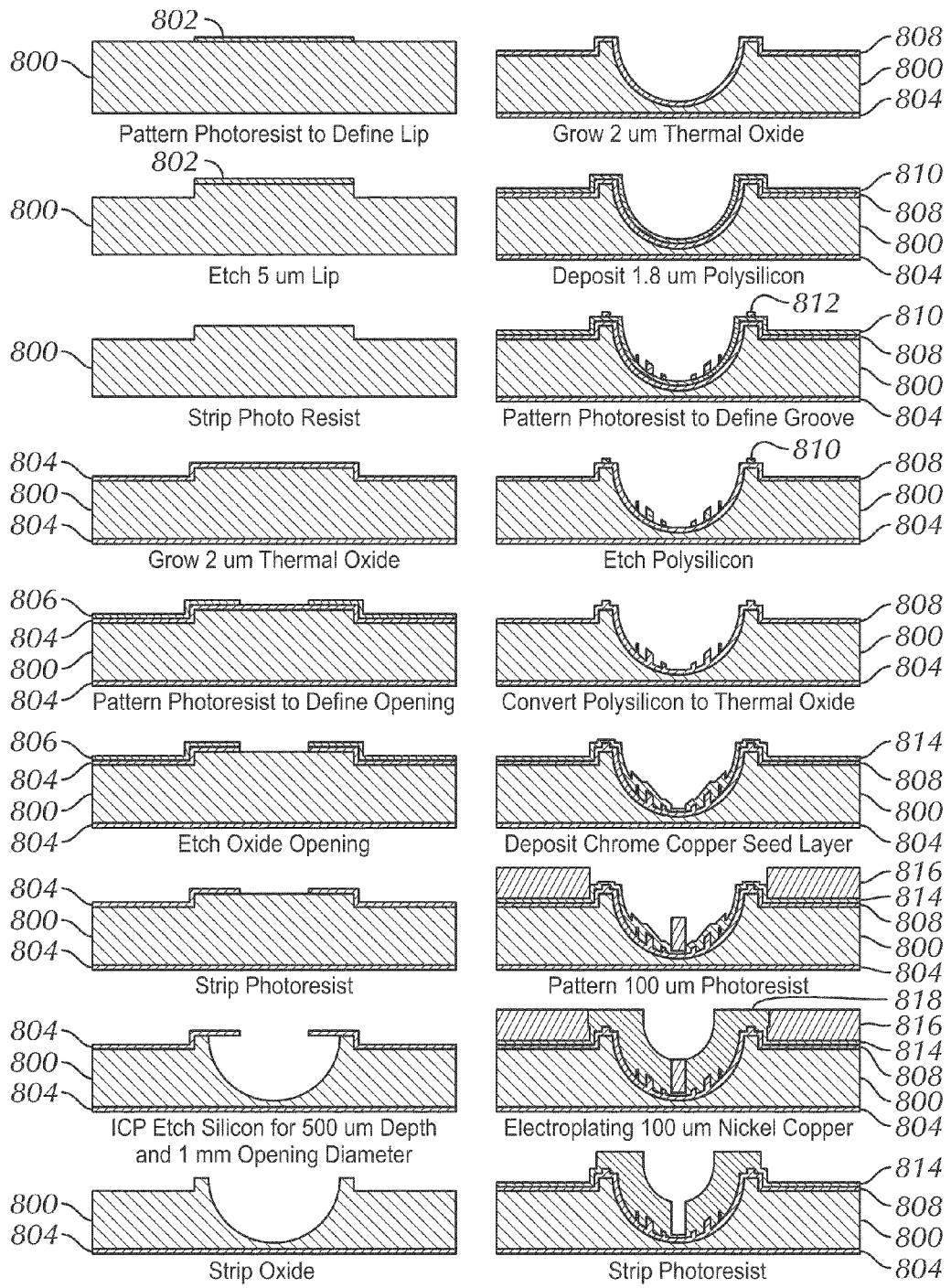
FIG. 8A is a sectional side view of wafer-level fabrication processes to form the fluid dynamic bearing as in FIG. 6A, in accordance with an embodiment of the present invention.

As further described in FIG. 8A, a sacrificial layer (previously situated within the area of fluid dynamic bearing 618) simultaneously forms the symmetrical facing surfaces of stationary component 604 and rotatable component 602. The sacrificial layer additionally forms the grooves (displayed as notches) are illustrated within the following lengths: length D5 representing fill hole 614; length D5 to D6 representing surfaces with optional grooves; length D6 to D7 representing a portion of herringbone grooves as formed in the stationary component; length D7 to D8 representing a portion of pressure generating spiral grooves (i.e., a grooved pumping seal for a thrust surface) as formed in the stationary component; and length D8 to D9 representing an outer diameter of the rotatable component.

Figure 6B:
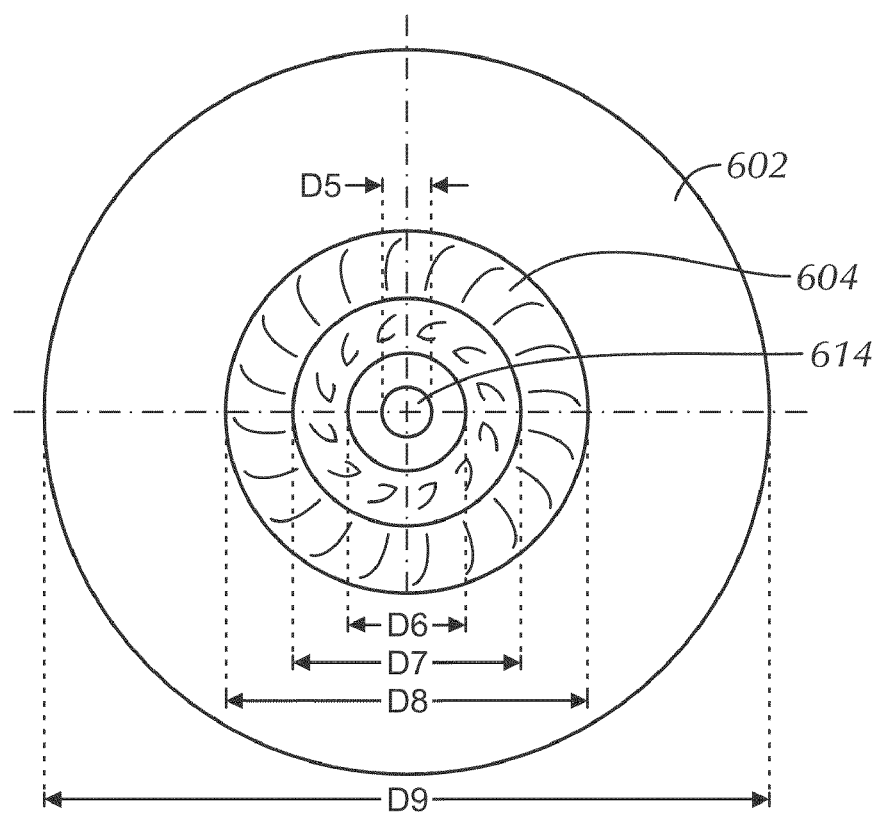
FIG. 6B is a view of the spiral and herringbone grooves of FIG. 6A, which can be utilized with a fluid dynamic bearing motor, in accordance with an embodiment of the present invention.

FIG. 6B is a view of spiral and herringbone grooves as utilized with a fluid dynamic bearing as in FIG. 6A. Corresponding to FIG. 6A, length D5 represents fill hole 614 defined through stationary component 604, and length D5 to D6 representing surfaces with optional grooves. The grooves are illustrated within the following lengths: length D6 to D7 representing a portion of herringbone grooves as formed in the stationary component 604; length D7 to D8 representing a portion of pressure generating spiral grooves (i.e., a grooved pumping seal for a thrust surface) as formed in the stationary component 604; and length D8 to D9 representing an outer diameter of the rotatable component 602.

Figure 7:
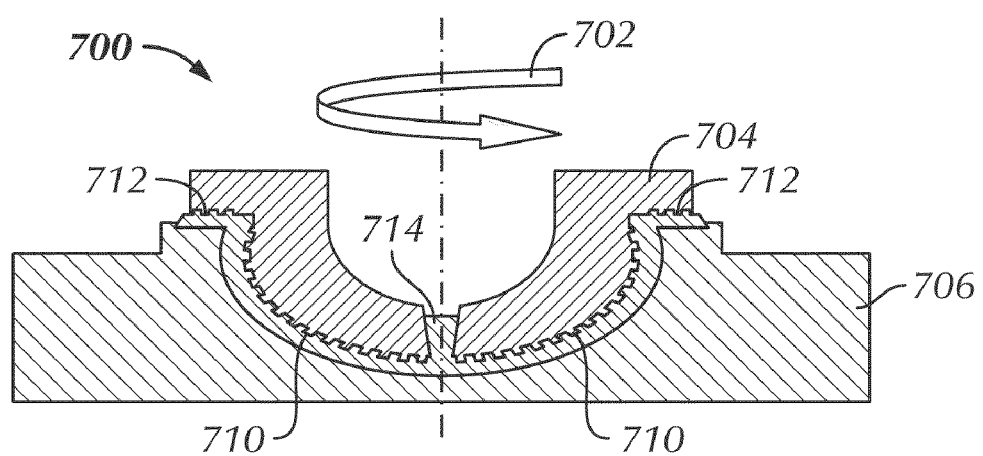
FIG. 7 is a sectional side view of a portion of another alternative fluid dynamic bearing, illustrating a spherical bearing surface with grooved features formed by microfabrication, in accordance with an alternative embodiment of the present invention.

FIG. 7 illustrates a sectional side view of a portion of another alternative fluid dynamic bearing 700, also formed by microfabrication. A sacrificial layer (previously situated within the area of fluid dynamic bearing) simultaneously forms the symmetrical facing surfaces of rotatable spherical component 704 and stationary component 706. The sacrificial layer additionally forms the grooves 710 and 712 (displayed as notches). Pressure generating grooves 710 may be designed as herringbone grooves providing increased pressure at an apex of the herringbone groove. Grooves 712 may be designed as a low volume and high pressure spiral grooves (i.e., a grooved pumping seal). Fluid fill hole 714 (not to size) is also formed through the rotatable spherical component 704.

Referring to FIG. 8A, a sectional side view is illustrated of a microelectromechanical systems (MEMS) wafer-level batch-fabrication processes to form the fluid dynamic bearing as in FIG. 6A. As illustrated, the process begins at the top left and progresses with the processes below, then continues at the top right and progresses with the processes below. The process described represents one example fabrication process, and modifications and step variations may be made to the fabrication process while remaining within the inventive teachings of the present invention.

Using standard photolithography, photoresist 802 is patterned onto a silicon wafer 800 to define a lip. The silicon wafer is etched, using an anistropic vertical etch, leaving a 5 μm lip below the photoresist 802. The photoresist 802 is stripped from the silicon wafer 800, and silicon dioxide 804 (i.e., 2 µm) is conformally grown on the silicon 800 after being placed in a high temperature oxidation furnace. Photoresist 806 is patterned onto the silicon dioxide 804, to define a desired opening. The silicon dioxide 804 is etched to define an opening therethrough to the silicon 800. The photoresist 806 is then stripped from the silicon dioxide 804. The silicon 800 is etched using an inductively coupled plasma etch to establishing a desired shape to the silicon 800 (i.e., 500 µm depth, and 1 mm opening diameter), using the silicon dioxide 804 as a mask. Since the silicon dioxide 804 is chemically active and isotropic in nature, it etches substantially equally in all directions. The silicon dioxide 804 is stripped from the top of the silicon wafer, and 2 µm of silicon dioxide 808 is conformally grown on the silicon 800. Polysilicon 810 (i.e., 1.8 µm) is conformally deposited onto the silicon dioxide 808 using a low pressure vapor deposition. Photoresist 812 is selectively patterned onto the polysilicon 810 to define grooves. The photoresist 812 and polysilicon 810 are selectively etched to form grooves. The polysilicon 810 is converted to silicon dioxide using thermal oxidation. A chrome copper seed layer 814 is deposited on the silicon dioxide. Photoresist 816 is patterned (i.e., 100 µm) on the chrome copper seed layer 814 using photolithography. Nickel copper 818 (i.e., 100 µm) is electroplated on the photoresist 816 and chrome copper 814, providing robustness. The photoresist 816 is stripped.

Figure 8B:
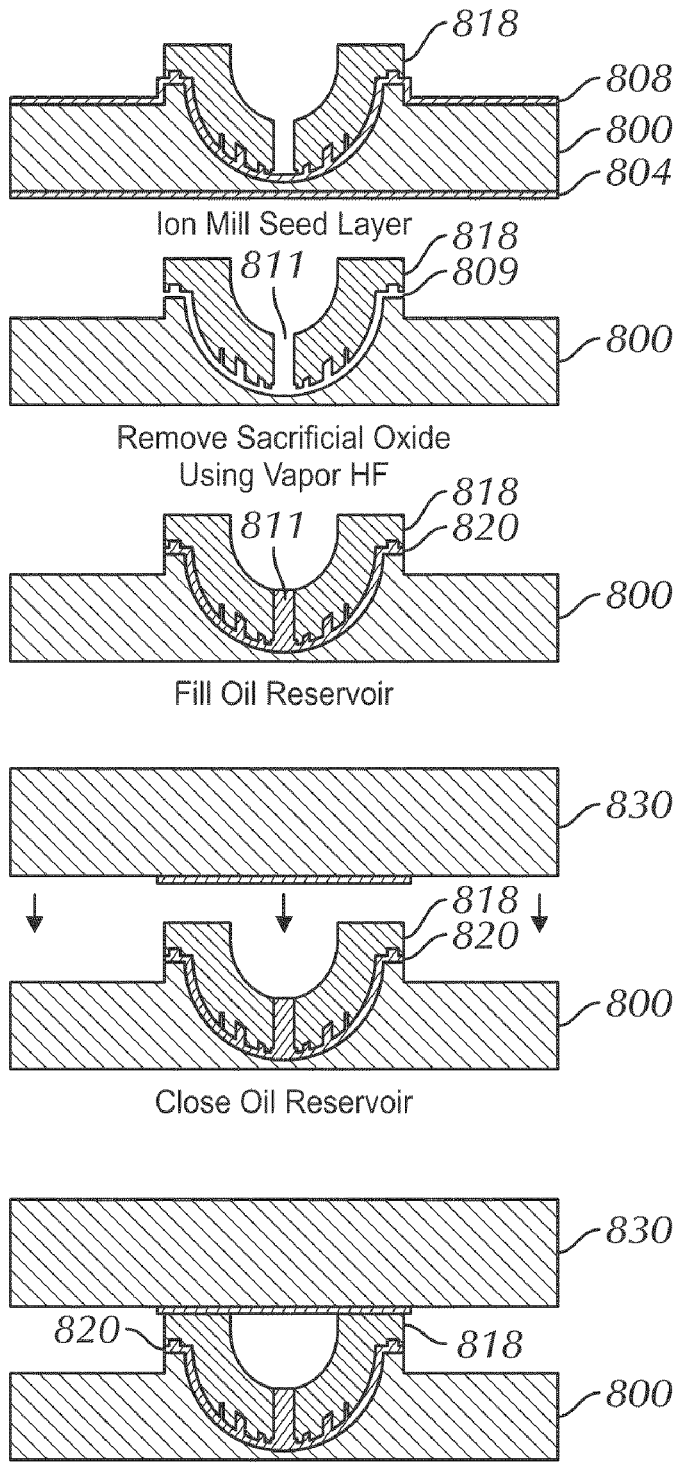
FIG. 8B is a sectional side view of further wafer-level fabrication processes to form the fluid dynamic bearing as in FIG. 6A, in accordance with an embodiment of the present invention.

Referring to FIG. 8B, a sectional side view is illustrated of further wafer-level fabrication processes to form the bearing as in FIG. 6A, in accordance with an embodiment of the present invention. Continuing from the process step of FIG. 8A, the chrome copper seed layer 814 is ion milled (using for example, deep reactive ion etching (DRIE)), and optionally a fluid fill hole 811 is formed. The sacrificial silicon dioxide 808 is removed using an anhydrous HF vapor etch, leaving a gap 809 and symmetrical facing surfaces of a stationary component 818 and a relatively rotatable component 800. An oil reservoir defined by the fluid fill hole 811, as well as the symmetric gap 809 is filled/injected with oil 820. An automated system, rather than the microfabrication process can dispense the oil 820 into the reservoir and the symmetric gap 809. The oil reservoir is closed/bonded with a top component 830 such as a hub.

Modifications and variations may be made to the disclosed embodiments while remaining within the spirit and scope of the invention. The implementations described above and other implementations are within the scope of the following claims.

We claim:

1. A method comprising:
    forming a stationary component;
    forming a rotatable component positioned for relative rotation about the stationary component;
    forming a sacrificial layer between the stationary component and the rotatable component; and
    removing the sacrificial layer, wherein said removing comprises:
        simultaneously forming symmetrical facing surfaces of the stationary component and the rotatable component, and
        defining between the symmetrical facing surfaces at least one of a gap, a journal bearing, a thrust bearing, a fluid channel, a fluid reservoir, a capillary seal, a grooved pumping seal, and a pressure generating groove.

2. The method as in claim 1, wherein the forming and the removing the sacrificial layer comprises patterning silicon dioxide, and subsequently removing the silicon dioxide from between the symmetrical facing surfaces.

3. The method as in claim 1, wherein the forming and the removing the sacrificial layer comprises:
    growing a first silicon dioxide layer on a silicon substrate;
    etching the silicon substrate using an inductively coupled plasma etch and using the first silicon dioxide layer as a mask to establish a desired shape of the silicon substrate;
    stripping the first silicon dioxide layer from the silicon substrate and conformally growing a sacrificial silicon dioxide layer on the silicon substrate;
    depositing a conformal polysilicon layer over the sacrificial silicon dioxide layer and patterning a photoresist on the conformal polysilicon layer;
    selectively etching the conformal polysilicon layer to define a groove and converting the conformal polysilicon layer to a second silicon dioxide layer;
    depositing a chrome copper seed layer over the sacrificial silicon dioxide layer and the second silicon dioxide layer and electroplating the chrome copper seed layer; and
    ion milling a portion of the chrome copper seed layer and removing the sacrificial silicon dioxide layer situated between the silicon substrate and the chrome copper seed layer, wherein the area defined by the removed sacrificial silicon dioxide layer defines the symmetrical facing surfaces.

4. The method as in claim 3, further comprising filling fluid into the area defined by the removal of the sacrificial silicon dioxide layer via a fluid fill hole, wherein the fluid fill hole is formed by the ion milling a portion of the chrome copper seed layer.

5. The method as in claim 1, wherein microelectromechanical systems (MEMS) wafer-level batch-fabrication techniques form the sacrificial layer.

6. The method as in claim 1, wherein the stationary component and the rotatable component are utilized with a small form factor motor for a disc drive data storage device, wherein the stationary component and the rotatable component have a diameter of less than 5 millimeters.

7. The method as in claim 1, wherein the facing surfaces are formed with an axial or a radial asymmetry tolerance of less than 1 micron.

8. The method as in claim 1, wherein the stationary component comprises a shaft and a stator and the rotatable component comprises a sleeve and a magnet, wherein further the shaft is established with a diameter of less than 0.6 mm and a length of less than 0.8 mm.

9. The method as in claim 1, further comprising integrating electrical, mechanical, or magnetic layers with the stationary component and the rotatable component.

10. An apparatus comprising:
    a stationary component;
    a rotatable component positioned for relative rotation about the stationary component; and
    symmetrical facing surfaces of the stationary component and the rotatable component, wherein
        the facing surfaces are formed by removing a sacrificial layer between the stationary component and the rotatable component,
        the facing surfaces define, therebetween, at least one of a journal bearing, a thrust bearing, a fluid channel, a fluid reservoir, a capillary seal, a grooved pumping seal, and a pressure generating groove, and
        the facing surfaces maintain an axial or a radial asymmetry tolerance of less than 1 micron.

11. The apparatus as in claim 10, further comprising:
two facing bi-spherical bearing surfaces formed by the microfabrication process, wherein the two facing bi-spherical bearing surfaces are stationary relative to one another and define a gap therebetween, and
a diverging capillary seal radially outboard from and fluidly connected to the gap.

12. The apparatus as in claim 11, further comprising an asymmetrical sealing system, wherein
the capillary seal is defined between the bi-spherical bearing surface and a facing surface of the stationary component, wherein the capillary seal comprises a diameter smaller than a diameter of the diverging capillary seal,
the diverging capillary seal is situated within a fluid channel defined by the stationary component; and
the diverging capillary seal is fluidly connected to and opposes the capillary seal.

13. The apparatus as in claim 10, further comprising a fluid fill hole defined by the stationary component or the rotatable component, wherein the fluid fill hole is formed by ion milling a portion of one of the stationary component and the rotatable component.

14. The apparatus as in claim 10, wherein the sacrificial layer is formed by microelectromechanical systems (MEMS) wafer-level batch-fabrication.

15. The apparatus as in claim 10, wherein the stationary component and the rotatable component are utilized with a small form factor motor for a disc drive data storage device, wherein the stationary component and the rotatable component have a diameter of less than 5 millimeters.

16. The apparatus as in claim 10, wherein the stationary component and the rotatable component are used with a 2.5 inch disc drive.

17. The apparatus as in claim 10, wherein one of the symmetrical facing surfaces is formed, at least partially, in the shape of a cone or sphere.

18. The apparatus as in claim 10, wherein the grooves are shaped as a sinusoidal, a spiral, a chevron, or a herringbone pattern.

19. The apparatus as in claim 10, wherein the stationary component comprises a shaft and a stator and the rotatable component comprises a sleeve and a magnet, wherein the shaft is established with a diameter of less than 0.6 mm and a length of less than 0.8 mm.

20. The apparatus as in claim 10, further comprising a data storage disc attached to the rotatable component and an actuator supporting a head proximate to the data storage disc for communicating with the data storage disc.

* * * * *